United States Patent
Sakagami et al.

(10) Patent No.: US 6,853,880 B2
(45) Date of Patent: Feb. 8, 2005

(54) AUTONOMOUS ACTION ROBOT

(75) Inventors: Yoshiaki Sakagami, Tokyo (JP); Nobuo Higaki, Hiki-gun (JP); Naoaki Sumida, Tokyo (JP); Yuichi Yoshida, Kitaadachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 181 days.

(21) Appl. No.: 10/225,287

(22) Filed: Aug. 22, 2002

(65) Prior Publication Data

US 2003/0055532 A1 Mar. 20, 2003

(30) Foreign Application Priority Data

Aug. 22, 2001 (JP) .................................... 2001-251642

(51) Int. Cl.[7] .......................... G05B 19/18; G05B 18/00
(52) U.S. Cl. ..................... 700/259; 700/245; 700/258; 700/246; 318/568.2
(58) Field of Search ................. 700/245, 247, 700/248, 249, 258, 259; 318/565, 568.1, 568.11, 568.12, 568.2; 901/1, 46, 47

(56) References Cited

U.S. PATENT DOCUMENTS

| | | | | |
|---|---|---|---|---|
| 6,337,552 B1 | * | 1/2002 | Inoue et al. | 318/568.2 |
| 6,374,157 B1 | * | 4/2002 | Takamura | 700/245 |
| 6,381,515 B1 | * | 4/2002 | Inoue et al. | 700/245 |
| 6,415,203 B1 | * | 7/2002 | Inoue et al. | 700/245 |
| 6,421,585 B1 | * | 7/2002 | Takamura | 700/245 |
| 6,438,454 B1 | * | 8/2002 | Kuroki | 700/245 |
| 6,438,457 B1 | * | 8/2002 | Yokoo et al. | 700/245 |
| 6,442,450 B1 | * | 8/2002 | Inoue et al. | 700/245 |
| 6,445,978 B1 | * | 9/2002 | Takamura et al. | 700/245 |
| 6,470,235 B2 | * | 10/2002 | Kasuga et al. | 700/246 |

(List continued on next page.)

FOREIGN PATENT DOCUMENTS

| | | | |
|---|---|---|---|
| EP | 0 898 237 A2 | * | 2/1999 |
| JP | 2001-13818 | | 1/2001 |
| WO | WO99/67067 | * | 12/1999 |
| WO | WO02/30627 | * | 4/2000 |
| WO | WO00/66239 | * | 11/2000 |
| WO | WO01/58650 | * | 8/2001 |

OTHER PUBLICATIONS

Yanagiswa et al., An operator interface for an autonomous mobile robot using whisle sound and a source direction detection system, 1995, IEEE, pp. 1118–1123.*

Maxwell et al., Alfred: The waiter who remembers you, 1999, Internet, pp. 1–12.*

Hara et al., Real–time facial interaction between human and 3D face robot agent, 1996, IEEE, pp. 401–409.*

Naya et al. Recognizing human touching behaviors using a haptic interface for a pet–robot, 1999, IEEE, pp. 1030–1034.*

*Primary Examiner*—Thomas G. Black
*Assistant Examiner*—McDieunel Marc
(74) *Attorney, Agent, or Firm*—Squire, Sanders & Dempsey, L.L.P.

(57) ABSTRACT

An autonomous action robot which can turn its line of sight to face a person who calls out, can recognize the face of a person, and can perform various actions in response to commands. First, a sound emitted from a person or other sound source is detected by a sound detector, and the direction of the sound source is specified based on the detected sound. Then, a robot head section is controlled, and the imaging direction of the robot head section is moved to face the specified direction of the sound source. Next, an image is captured in the direction of the sound source, and a target image of a specific shape is extracted from the captured image. Then, the imaging direction of the robot head section is controlled and moved to face in the direction of the extracted target image.

9 Claims, 10 Drawing Sheets

U.S. PATENT DOCUMENTS

| | | | |
|---|---|---|---|
| 6,480,761 B2 * | 11/2002 | Ueno et al. | 700/245 |
| 6,493,606 B2 * | 12/2002 | Saijo et al. | 700/245 |
| 6,505,098 B1 * | 1/2003 | Sakamoto et al. | 700/245 |
| 6,507,773 B2 * | 1/2003 | Parker et al. | 700/258 |
| 6,512,965 B2 * | 1/2003 | Osawa | 700/245 |
| 6,519,506 B2 * | 2/2003 | Osawa | 700/245 |
| 6,526,332 B2 * | 2/2003 | Sakamoto et al. | 700/259 |
| 6,529,802 B1 * | 3/2003 | Kawakita et al. | 700/245 |
| 6,539,283 B2 * | 3/2003 | Takagi | 700/245 |
| 6,542,788 B2 * | 4/2003 | Hosonuma et al. | 700/245 |
| 6,560,511 B1 * | 5/2003 | Yokoo et al. | 700/245 |
| 6,577,924 B1 * | 6/2003 | Kasuga et al. | 700/245 |
| 6,587,751 B2 * | 7/2003 | Takamura et al. | 700/245 |
| 6,604,021 B2 * | 8/2003 | Imai et al. | 700/245 |
| 6,708,081 B2 * | 3/2004 | Yoshida | 700/245 |
| 6,711,469 B2 * | 3/2004 | Sakamoto et al. | 700/245 |
| 2002/0049515 A1 * | 4/2002 | Osawa | 700/245 |
| 2002/0193908 A1 * | 12/2002 | Parker et al. | 700/258 |

* cited by examiner

SELECTED REGION MAP
OF SOUND ARRIVAL TIME
DIFFERENCE $\tau$ FROM SOUND
PRESSURE DIFFERENCE

FACIAL IMAGE
CANDIDATE F(x, y) 1

FACIAL IMAGE
CANDIDATE F(x, y) 2

AUTONOMOUS ACTION ROBOT

BACKGROUND OF THE INVENTION

1. Field of the Invention

The present invention relates to autonomous action robots. More specifically, the present invention relates to an autonomous action robot which performs movement and attitude control using both image processing and speech processing.

2. Description of the Related Art

Recently, autonomous action robots have been developed which aim to coexist with human beings as their companions. Some of these autonomous action robots can respond to a human voice and perform predetermined actions. Furthermore, some robots can capture a scene, which includes a target which is the object of recognition, as image information using a variety of sensors such as cameras, and can recognize the target using this image information and fragmentary information relating to the target. For example, one embodiment of an autonomous action robot is a humanoid robot which recognizes human speech, and behaves as much like a human as possible by performing various operations based on the content of the speech, thus establishing a sense of affinity.

However, in order to develop a humanoid robot which behaves as similarly as possible to a real human being, a function whereby the robot responds to a person calling out, who lies outside the range of vision of the robot, and turns to face this person, and can then identify the face of this person, is necessary. In addition, future humanoid robots will require a function which, when a person indicates an object by a gesture or the like, allows the robot to shift its line of sight to the indicated object and recognize the object.

SUMMARY OF THE INVENTION

In consideration of the above circumstances, an object of the present invention is to provide an autonomous action robot which can move its line of sight to face a person who calls out to the robot, which can recognize the face of a person, and can perform actions according to a number of different commands.

In order to solve the above problem, a first aspect of the invention is characterized in comprising: a sound detection device which detects a sound emitted from a sound source; a sound source locating device which specifies a direction of a sound source based on the sound detected by the sound detection device; an imaging device which captures an image of surroundings; a target image extraction device which extracts a target image of a specific shape from a captured image; and a control device which controls an imaging direction of the imaging device to face a direction of the target image based on the specified sound source direction and the extracted target image.

According to this aspect of the invention, first, a sound emitted from a person or other sound source is detected by the sound detection device. Next, the direction of the sound source which emitted the sound is specified by operating the sound source locating device based on the detected sound. In addition, by operating the control device, a camera which functions as the imaging device for taking an image of the surroundings is controlled, and the imaging direction of the camera is moved to face the specified direction of the sound source. Then, by operating the imaging device, an image is captured of the surroundings in the direction of the sound source. Next, by operating the target image extraction device, the target image of a specific shape is extracted from the captured image. Then, by activating the control device, the imaging direction of the imaging device is controlled and moved to face the direction of the extracted target image.

Consequently, even when a person or the like who lies outside the visual field of the camera mounted on the autonomous action robot emits a sound, it is possible to automatically move the imaging direction of the camera to face the direction of the person or the like in response to the sound.

A second aspect of the invention is characterized in that in the first aspect of the invention, the specific shape is a shape of a human face, and there is further provided an identification device which identifies a specific human face.

According to this aspect of the invention, by operating the target image extraction device, the target image, which has the shape of a human face, is extracted from the captured image. Then, by operating the identification device, the face is identified as that of a specific human based on the extracted target image.

Consequently, by extracting and identifying the face of the human who emits the sound, it is possible to perform individual recognition of a specific person.

A third aspect of the invention is characterized in that the first or second aspects of the invention further comprise: a speech recognition device which recognizes a detected sound as a specific speech command; and an attitude and position changing device which changes an attitude and a position of the robot based on a recognized speech command.

According to this aspect of the invention, sound detected by operating the sound detection device is recognized as a specific speech command by the speech recognition device. Then, by operating the attitude and position changing device based on the recognized speech command, the attitude or position of the autonomous action robot is changed.

Consequently, it is possible to perform predetermined attitude variation or movement operations according to the nature of the speech command emitted by a person.

A fourth aspect of the invention is characterized in comprising: a sound detection device which detects a sound emitted from a sound source; a sound source locating device which specifies a direction of a sound source based on a detected sound; an imaging device which captures an image of surroundings; a target image extraction device which extracts a target image of a specific shape from a captured image; and an attitude and position changing device which changes an attitude and a position of the robot to face towards the target image based on the specified sound source direction and the extracted target image.

According to this aspect of the invention, at first, a sound emitted from a person or other sound source is detected by operating the sound detection device. Next, the direction of the sound source which emitted the sound is specified by activating the sound source locating device based on the detected sound. Then, by operating the imaging device, an image is captured of the surroundings of the autonomous action robot. Next, by operating the target image extraction device, a target image of a specific shape is extracted from the captured image. Then, by operating the attitude and position changing device, the attitude or position is changed so that the robot faces the target image, based on the specified sound source direction and the extracted target image.

Consequently, it is possible to not only recognize the position of a person from his/her voice, but also to behave like a human, thus establishing a sense of affinity with the person.

A fifth aspect of the invention is characterized in that any one of the first through fourth aspects of the invention further comprise a contour extraction device which extracts a contour of the target image by applying a dynamic contour model to a captured image.

According to this aspect of the invention, the contour of the target image is extracted from within the captured image by operating the contour extraction device which applies a dynamic contour model called a "Snake" to the image input by operating the image input device.

Consequently, it is possible to extract the contour of a person with high accuracy using a moving body extraction algorithm which uses a dynamic contour model.

A sixth aspect of the invention is characterized in that in any one of the first through fifth aspects of the invention, the imaging device comprises at least two coordinated imaging devices, and there is further provided a distance information detection device which detects distance information by viewing a stereo image comprising two captured images stereoscopically.

According to this aspect of the invention, the imaging device which captures an image of a person or the like comprises an imaging apparatus incorporating two cameras, and a stereo image is captured by these two cameras. By viewing the captured stereo image stereoscopically by operating the distance information detection device, distance information which indicates the distance from the camera is detected.

Consequently, it is possible to detect not only the direction of the person or the like who emitted the sound, but also information relating to the three-dimensional positional relationship with the camera.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of a particular preferred embodiment, set out below to enable one to build and use one particular implementation of the invention, is not intended to limit the enumerated claims, but to serve as a particular example thereof.

Figure 1:
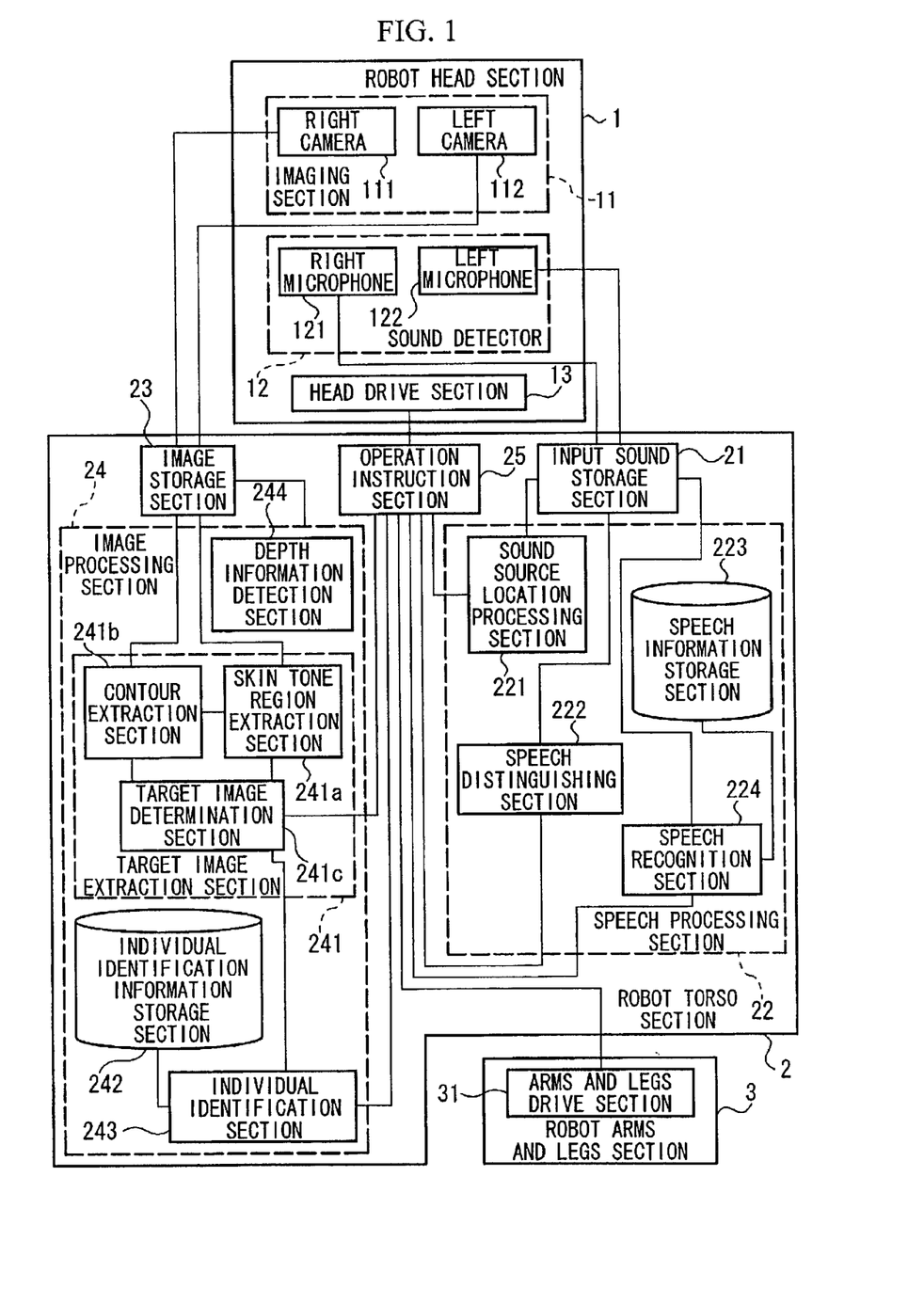
FIG. 1 is a block diagram showing the structure of an autonomous action robot according to an embodiment of the present invention.

FIG. 1 is a block diagram showing the structure of an autonomous action robot according to an embodiment of the present invention. The humanoid robot of this embodiment is envisaged as a humanoid robot which is capable of establishing a sense of affinity in a face-to-face interaction with a human, and comprises a robot head section 1 which corresponds to the head, with eyes and ears and the like, a robot torso section 2 which corresponds to the torso, and a robot arms and legs section which corresponds to the arms and legs. In the case of a quadrupedal pet robot such as those modeled after a dog or a cat, the arms and legs of the robot are divided into four sections and the respective sections operate in a coordinated manner. However, in the present embodiment, for the sake of convenience, these are described collectively as one robot arms and legs section 3.

The robot head section 1 comprises an imaging section 11 which captures a color image of the surroundings, a sound detector 12 which detects a sound emitted from a sound source, and a head drive section 13 which can position the robot head section 1, to which the imaging section 11 and the sound detector 12 are fixed, to face an arbitrary angle in the horizontal and vertical directions.

In order to serve as the eyes of the humanoid robot, the imaging section 11 comprises two coordinated CCD cameras, located on the front face of the robot head section at equal heights and in the same horizontal plane, which can capture a color stereo image. These cameras are indicated in FIG. 1 as a right camera 111 and a left camera 112. In the present embodiment, the input image is assumed to be an 8 bit image with 256 shades. Furthermore, in order to serve as the ears of the humanoid robot, the sound detector 12 comprises two microphones disposed on the left and right sides of the robot head section 1 respectively. These two microphones are indicated in FIG. 1 as a right microphone 121 and a left microphone 122. The analog input sound signal received by these microphones is converted to a digital time series signal.

The robot torso section 2 comprises an image storage section 23 which stores the color stereo image captured by the imaging section 11, and an image processing section 24 which processes the stored image and obtains information used for moving the robot head section 1 and the robot arms and legs section 3 in a predetermined manner. Furthermore, the robot torso section 2 comprises an input sound storage section 21 which stores information relating to the sound detected by the sound detector 12, and a speech processing section 22 which processes the input sound and obtains information used to operate the robot head section 1 in a predetermined manner. The robot torso section 2 also comprises an operation instruction section 25 which issues operation instructions for controlling the operation of the robot head section 1 and the robot arms and legs section 3 to change the direction of the robot head section 1, and change the attitude and the position of the robot, based on the results of the processing performed in the speech processing section 22 and the image processing section 24.

The speech processing section 22 comprises a sound source location processing section 221 which specifies the relative direction of the sound source within the horizontal plane using the difference in time taken for the sound to reach each microphone and the difference in sound pressure at each microphone, based on the information relating to stored sound, a speech distinguishing section 222 which distinguishes whether or not the sound is speech emitted by a human, a speech information storage section 223 in which specific speech commands are stored, and a speech recognition section 224 which is connected to the speech information storage section 223 and recognizes whether or not the input speech is a specific command.

On the other hand, the image processing section 24 comprises a target image extraction section 241 for extracting a specific target from the captured image, an individual identification information storage section 242 in which individual information for identifying a specific person is stored, an individual identification section 243 which is connected to the target image extraction section 241 and the individual identification information storage section 242 and identifies whether or not the extracted human facial image is that of a specific individual, and a distance information detection section 244 which calculates distance information from the stereo image stored in the image storage section 23 by viewing the image stereoscopically.

Furthermore, the target image extraction section 241 comprises a skin tone region extraction section 241a which extracts skin tone regions including human facial images and the like, a contour extraction section 241b which extracts the contour of a person or the like, and a target image determination section 241c which determines a specific target image based on the information extracted by the skin tone region extraction section 241a or the contour extraction section 241b.

At first, the skin tone region extraction section 241a performs a color space conversion on the color image which was captured in RGB to convert it to HLS, and creates a skin tone region image by extracting only the region which contains skin tones, using the hue components and the like of the image. Furthermore, the contour extraction section 241b is a device for extracting the contour section of the skin tone region extracted by the contour extraction section 241b as an edge and creating an edge image. The processing in the skin tone region extraction section 241a and the contour extraction section 241b may also utilize the skin tone region extraction and contour extraction processes disclosed in Japanese Unexamined Patent Application, First Publication No. 2001-013818.

Furthermore, in addition to the aforementioned extraction method, the contour extraction section 241b can also extract the contour of the target image from within the captured image by operating the contour extraction device which applies a dynamic contour model called a "Snake".

The robot arms and legs section 3 is further provided with an arms and legs drive section 31 which is connected to the operation instruction section 25 of the robot torso section 2 and controls the arms and legs of the robot to perform predetermined actions. In this manner, the head drive section 13, the operation instruction section 25 and the arms and legs drive section 31 constitute a control device for the operation of the humanoid robot, causing the robot to move in such a manner that a sense of affinity is established between the robot and the person facing the robot.

Next, the operation of the embodiment described above is described with reference to the drawings.

Figure 2:
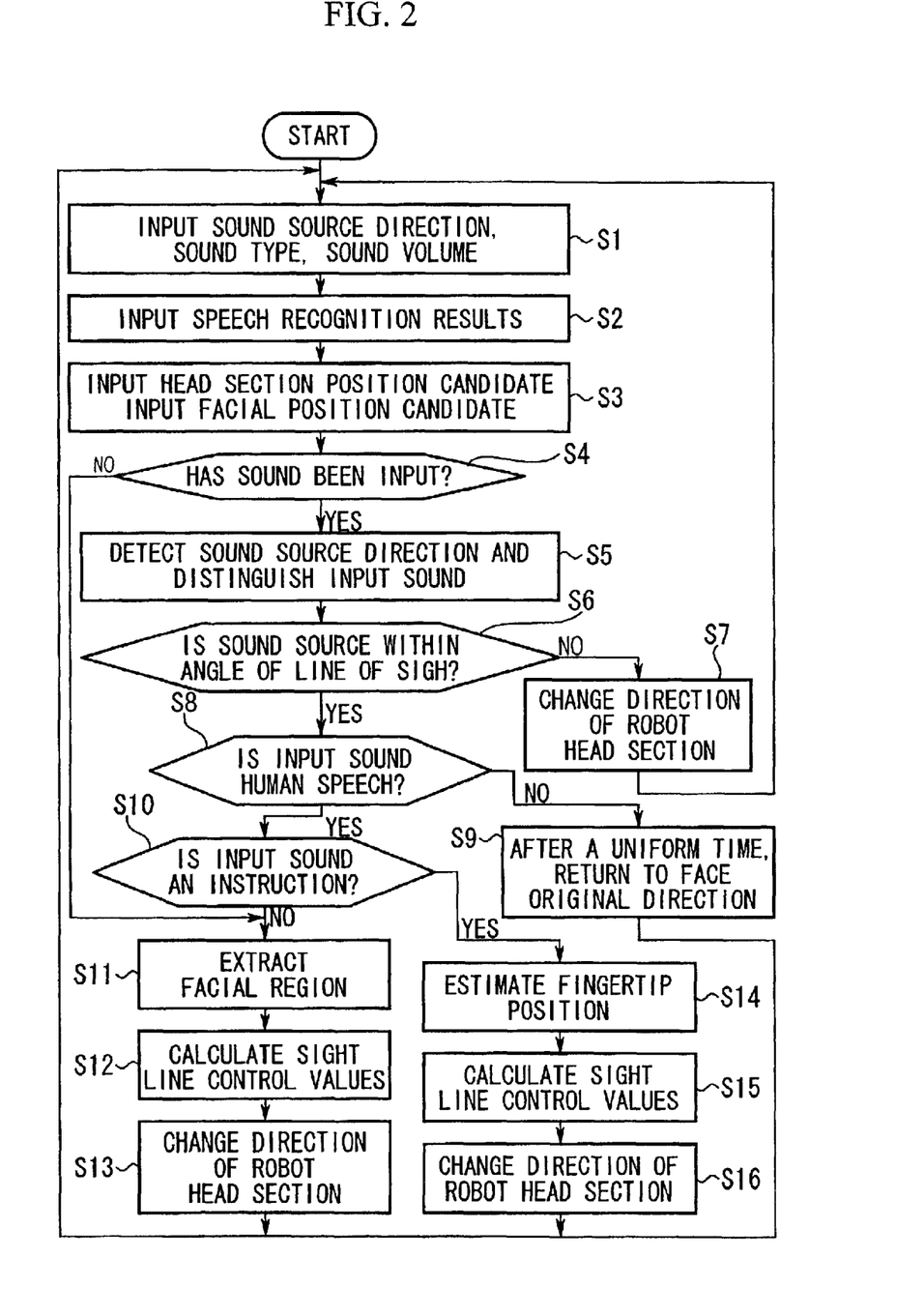
FIG. 2 is a flow chart describing the operation of each section of the autonomous action robot according to the embodiment.

FIG. 2 is a flow chart describing the operation of each section of the autonomous action robot according to this embodiment. The description below assumes that the image processing, the sound source location processing, the speech recognition processing and the operation instruction processing are each executed in parallel, and that the sight line control values are calculated based on the results of these processes, and the head section is then driven accordingly.

First, the sound source direction, the type of sound and the sound volume are input (step S1). The speech recognition results are then input (step S2). In addition, the head section position candidate and the facial position candidate are input (step S3).

Then, a determination is made as to whether or not a sound has been input (step S4). If, as a result of this determination, a sound has not been detected by the sound detector 12 (NO), then the target image extraction process is performed by operating the image processing section 24 on the captured image (step S11). If some sound is detected (YES), then information relating to the sound is stored in the input sound storage section 21. Here, information relating to the sound includes the received signal of the detected sound, the times at which the sound arrived at the left and right microphones 121 and 122, and the time difference therebetween. Then, the various information supplied to the operation instruction section 25 is obtained by processing this speech information in the speech processing section 22.

Figure 3:
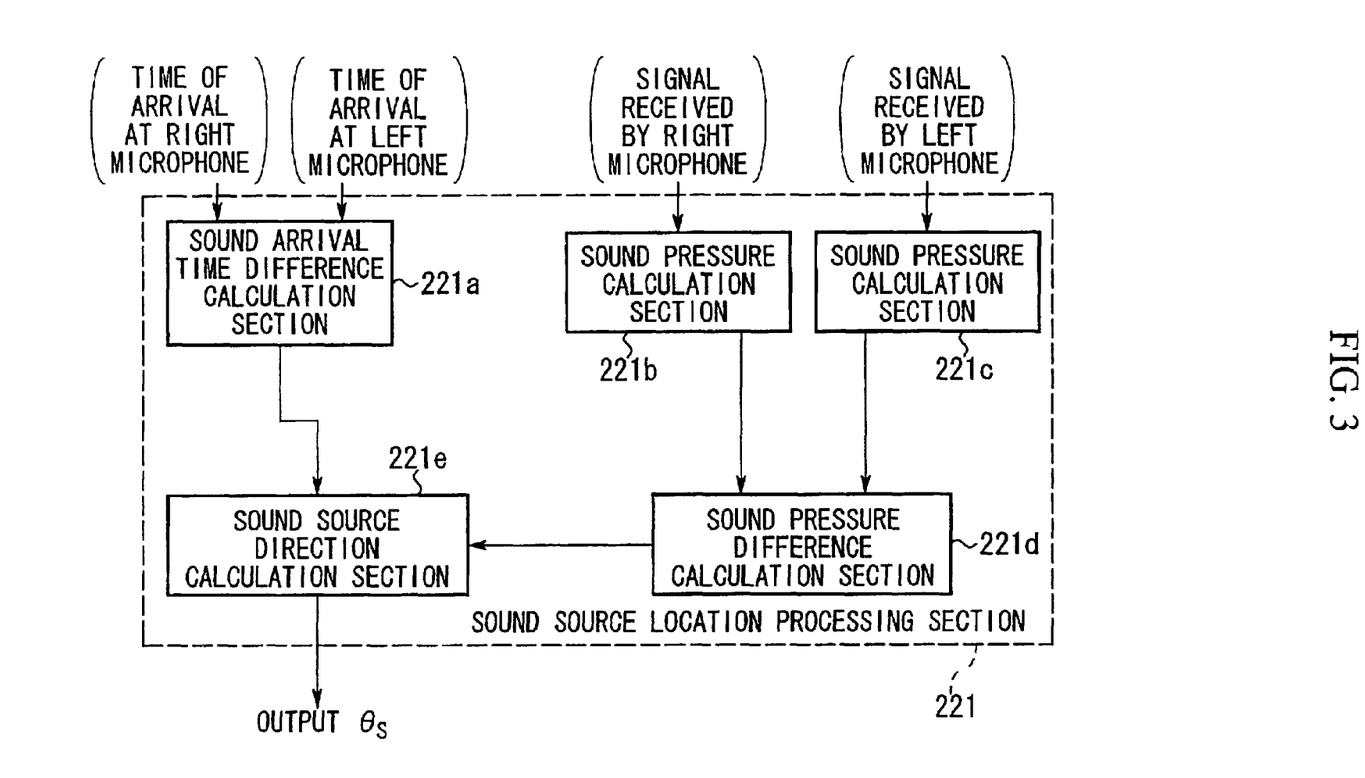
FIG. 3 is a block diagram showing in detail the construction of a sound source location processing section of the autonomous action robot according to the embodiment.

The direction of the source of the sound detected by the left and right microphones 121, 122 relative to the robot is specified by the sound source location processing section 221 of the speech processing section 22 (step S5). Here, the steps involved in specifying the direction of the sound source are described using the figures. FIG. 3 is a block diagram showing in detail the construction of the sound source location processing section 221 of the autonomous action robot according to this embodiment. In FIG. 3, the time of arrival of the sound detected by the left and right microphones 121, 122 is input into a sound arrival time difference calculation section 221a based on the information relating to the input sound stored in the input sound storage section 21, and the time difference therebetween is calculated. In other words, the phase difference between the time series is estimated from the cross correlation function of both input time series, and the candidate of the sound arrival time difference τ is output.

Furthermore, in sound pressure measurement sections 221b and 221c, the sound pressure $V_S$ is calculated as a dB value, by calculating from the received signal relating to the sound detected by the right and left microphones 121, 122 respectively, the square root of the mean square within a constant time window of the input time series. The difference between the sound pressures determined in the sound pressure calculation sections 221b and 221c is then calculated as a dB value in a sound pressure difference calculation section 221d. As a result, the direction $\theta_s$ of the sound source can be output from a sound source direction calculation section 221e based on the sound detected by the right microphone 121 and the left microphone 122.

Figure 4A:
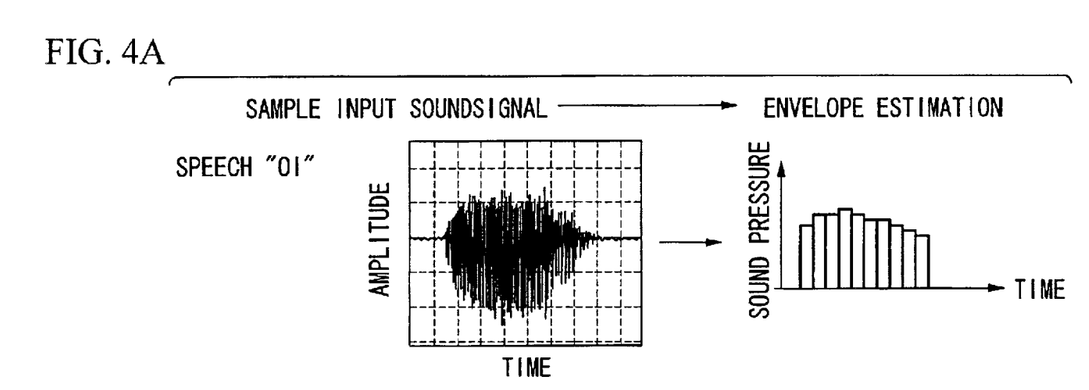
FIGS. 4A and 4B are graphs showing a calculation example of sound pressure using an envelope (waveform shape) estimated from time variation in the sound pressure at an input initial position.
Figure 4B:
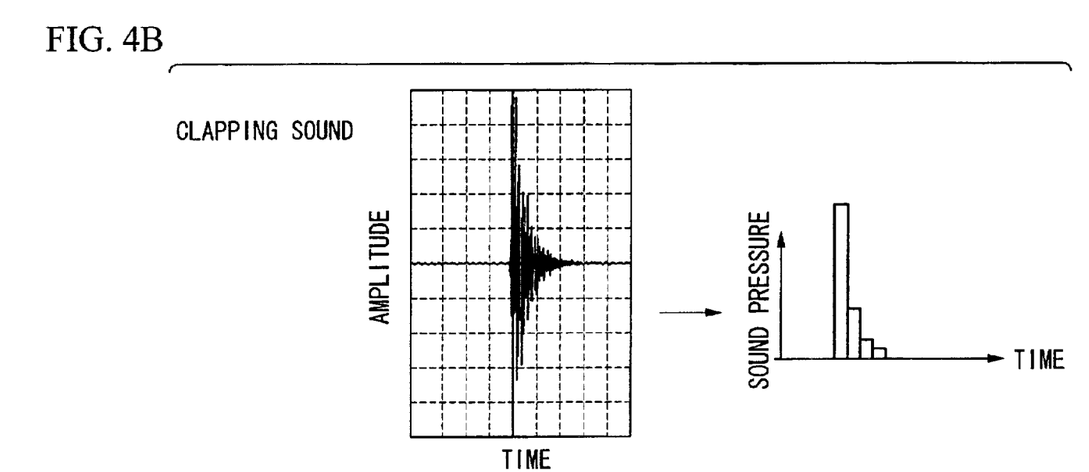

The method used to calculate the sound pressure is described below. FIGS. 4A and 4B are diagrams showing an example of calculating the sound pressure using an envelope (waveform shape) estimated from the variation over time in the sound pressure at an input initial position. For example, as shown in FIG. 4A, if the voice of a person saying "Oi" is input and a relationship between amplitude and time is obtained as shown on the left of the diagram, then envelope estimation can be used to convert this relationship to a relationship between sound pressure and time as shown on the right of the diagram. The smoothness of the envelope is then evaluated, and if the envelope is smooth it is determined to be a human voice and the label $V_S$ is set to a positive value, whereas if there are steep rises in the envelope, the sound is determined to be not a human voice and the label $V_S$ is set to a negative value. Furthermore, as shown in FIG. 4B, a clapping sound is distinctive in that is has a larger amplitude but a shorter measured duration than a human voice.

Figure 5A:
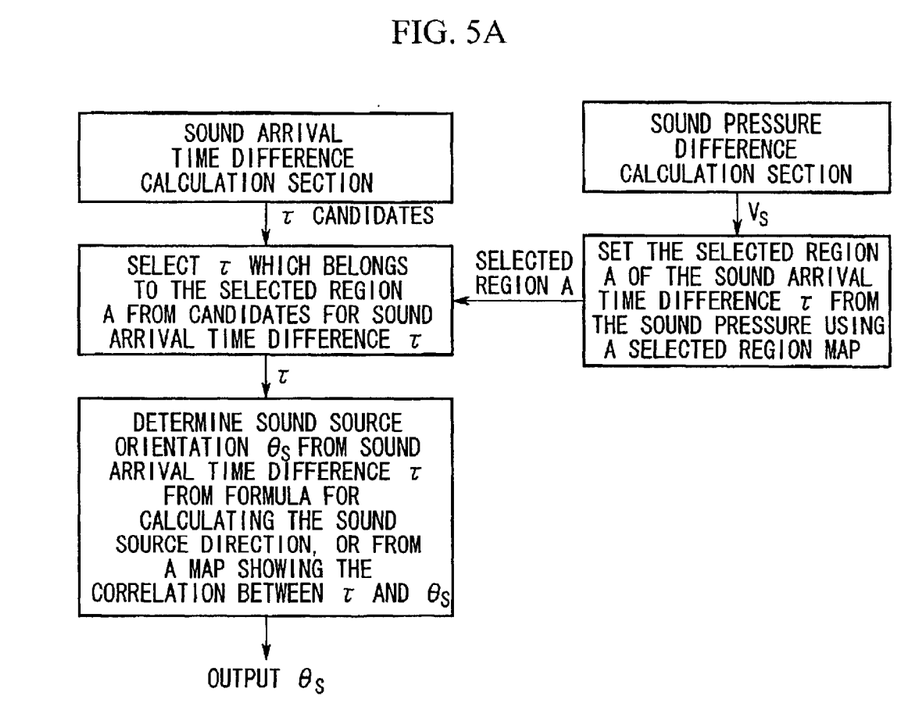
FIGS. 5A is a block diagram and 5B and 5C are graphs describing the steps involved in determining the sound source direction which is output by the sound source location processing section shown in FIG. 3.

On the other hand, FIGS. 5A is a diagram and 5B and 5C are graphs describing the steps involved in determining the sound source direction which is output from the sound source location processing section 221 shown in FIG. 3. Here, the relative direction of the sound source in the horizontal direction is estimated using the time difference and the sound pressure difference between the sound signals which reach the two sound input terminals (right microphone 121 and left microphone 122). FIG. 5A is a diagram describing in detail the steps in the operation of the sound source location processing section 221. The candidate for the sound arrival time difference τ is calculated in the sound arrival time difference calculation section 221a. Furthermore, the sound pressure difference $V_S$ is calculated in the sound pressure difference calculation section 221d.

Figure 5B:
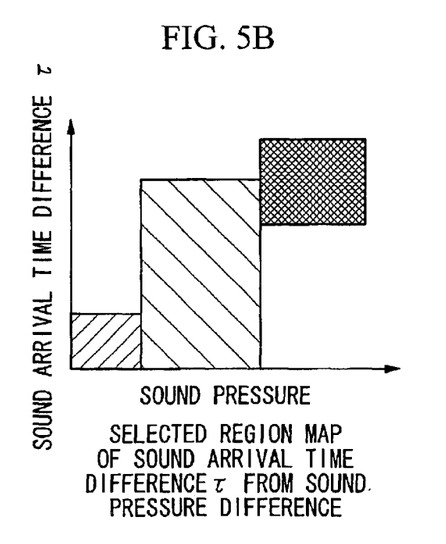
Figure 5C:
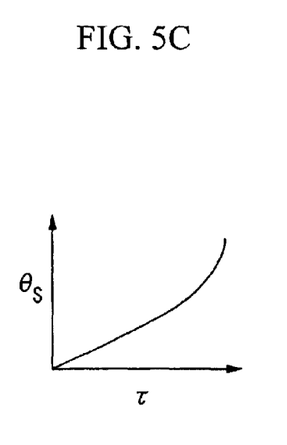

Next, a selected region A of the sound arrival time difference τ is set from the calculated sound pressure difference using a selected region map of the sound arrival time difference τ determined from the sound pressure, as shown in FIG. 5B. A value for τ which belongs to the selected region A is then selected from the candidates of the sound arrival time difference τ. The direction $θ_s$ of the sound source is then calculated either from the sound arrival time difference τ calculated in this manner, using a formula shown below for calculating the direction of the sound source, or from a map showing the correlation between τ and $θ_s$ as shown in FIG. 4C.

Figure 6:
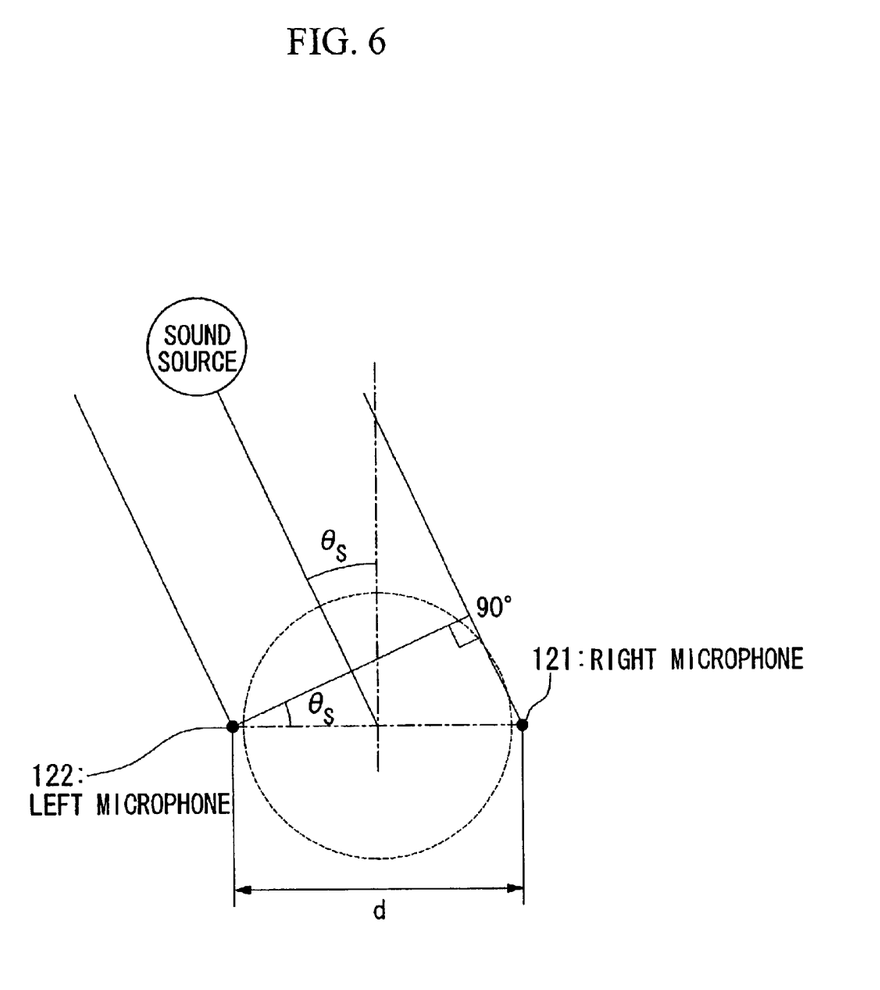
FIG. 6 is a diagram describing the direction $\theta_s$ of the sound source in the present embodiment.

FIG. 6 is a diagram describing the direction $θ_s$ of the sound source in the present embodiment. As shown in FIG. 6, the direction of the sound source is indicated by an angle $θ_s$ formed between a line segment connecting the left and right microphones 121 and 122, and a line segment connecting the sound source to the middle point of the line segment connecting the left and right microphones. In other words, the direction of the sound source can be obtained from an angle $θ_s$ expressed by a formula (1) shown below.

$$θ_s = \sin^{-1}(V \cdot τ/d) \quad (1)$$

Here, V is the speed of sound, τ is the difference in the arrival time of the sound detected by the two microphones, and d is the distance between the microphones.

Figure 7:
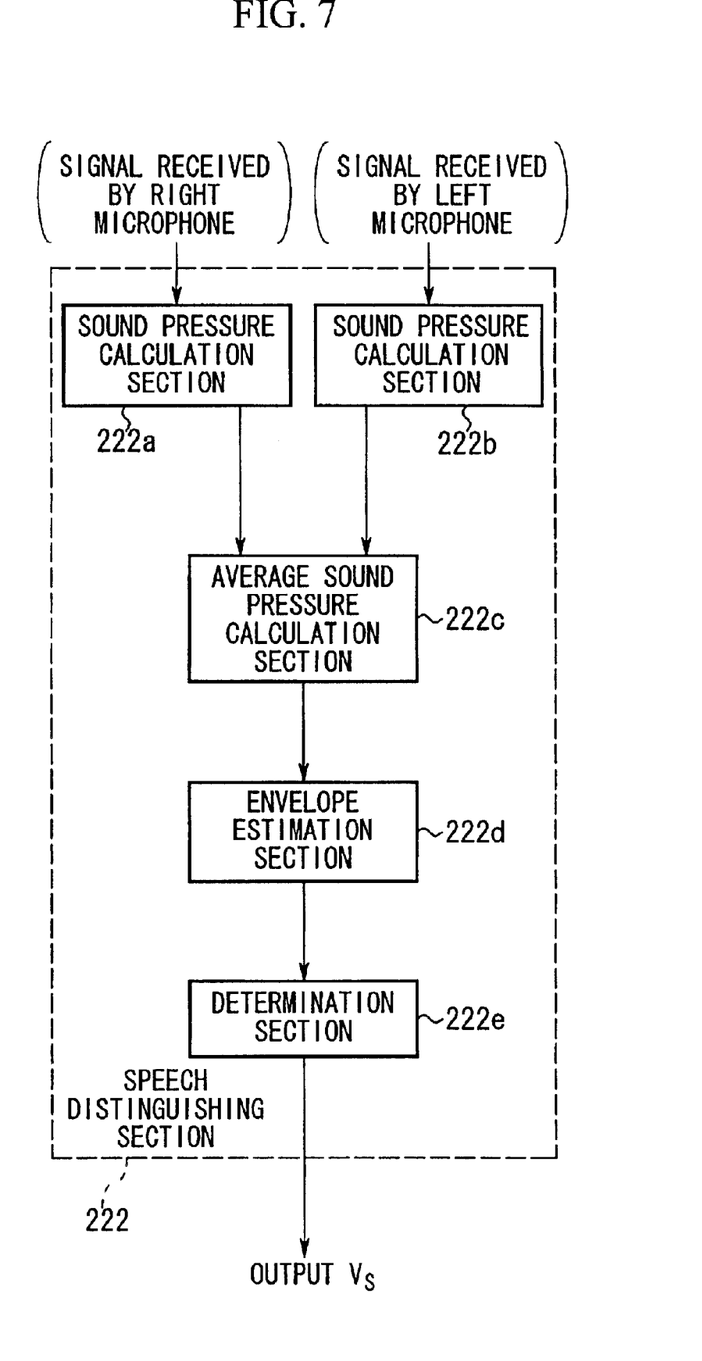
FIG. 7 is a block diagram showing in detail the structure of a speech distinguishing section.

At the same time, a determination as to whether or not the detected sound is a human voice, or another type of sound, is made in the speech distinguishing section 222 (step S5). FIG. 7 is a block diagram showing in detail the structure of the speech distinguishing section 222. Here, the determination of whether the sound signal is speech or another type of sound is made by evaluating the envelope (waveform shape) at the input initial position of the sound signal reaching the sound input terminals (the right microphone 121 and the left microphone 122). In FIG. 7, sound pressure calculation sections 222a and 222b are sections for calculating the sound pressure of the sound detected by the right microphone 121 and the left microphone 122 respectively. Furthermore, an average sound pressure calculation section 222c is a section which calculates the average sound pressure of the calculated sound pressure values. In addition, an envelope estimation section 222d is a section which estimates the envelope from the amplitude, as shown in FIG. 4. Finally, a determination section 222e is a section which determines whether a sound is human speech or another type of sound.

Figure 8:
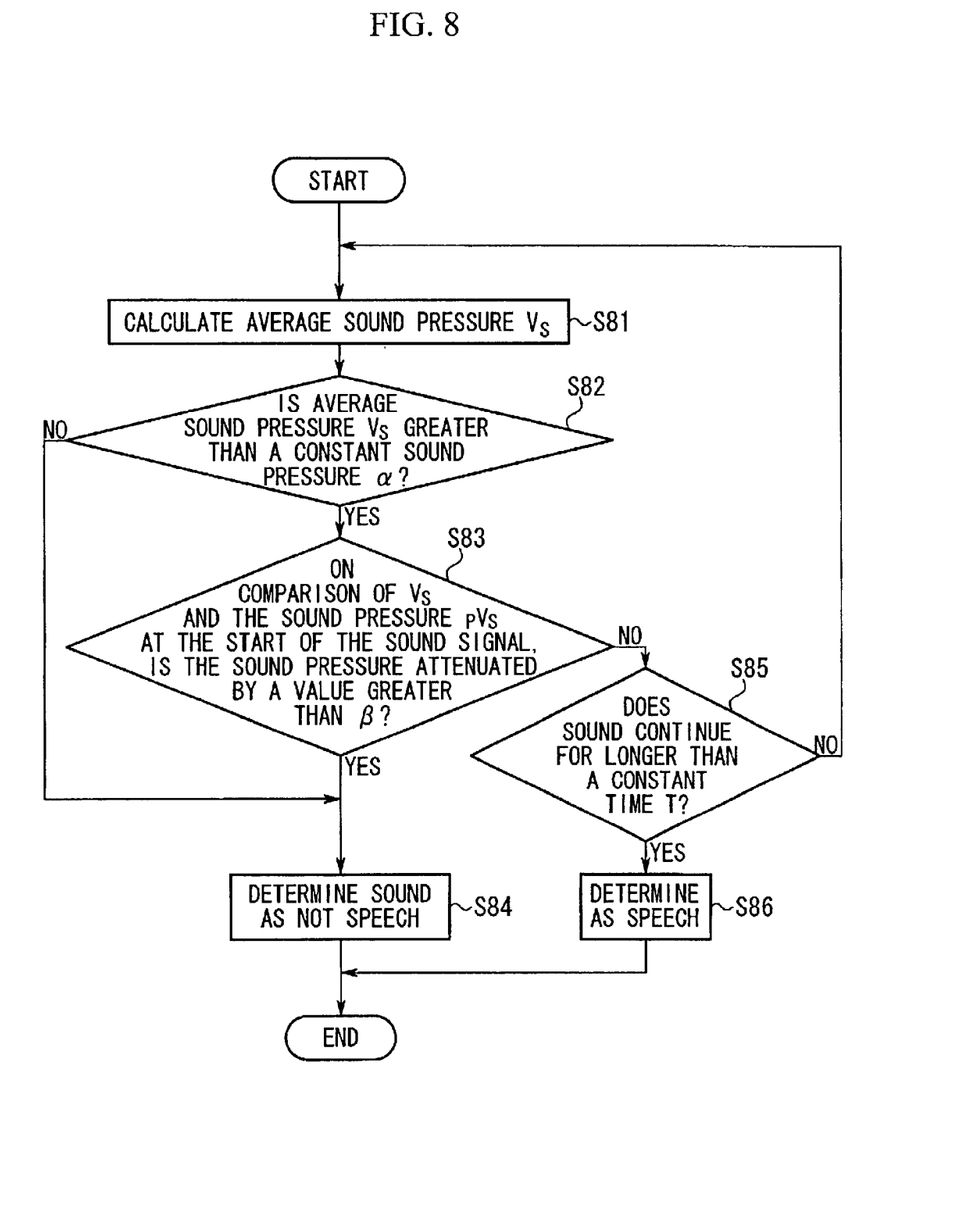
FIG. 8 is a flowchart describing the operation of the speech distinguishing section shown in FIG. 7.

FIG. 8 is a flow chart describing the operation of the speech distinguishing section 222 shown in FIG. 7. As described above, the sound pressure of the input sound is calculated, and then the average sound pressure $V_S$ is calculated by the average sound pressure calculation section 222c, and an envelope such as that shown in FIG. 4 is estimated by the envelope estimation section 222d (step S81). Then a determination is made as to whether or not the calculated average sound pressure $V_S$ is higher than a preset constant value α (step S82). If the average sound pressure $V_S$ is determined to be higher than the preset constant value α (YES), then the average sound pressure $V_S$ and the sound pressure $pV_S$ at the start of the sound signal are compared, and a determination is made as to whether or not the sound pressure is attenuated by a value greater than β (step S83). On the other hand, if the average sound pressure $V_S$ is not greater than the constant value α in step S82 (NO), then the sound is determined to be not that of a human voice (step S84).

In step S83, if the sound pressure is determined to be attenuated by a value greater than β (YES), then the sound is determined to be not that of a human voice (step S84). Furthermore, if the sound pressure is determined to be not attenuated by a value greater than β (NO), then the process proceeds to step S85 and a determination is made as to whether the duration of the sound is longer than a constant time T. If the sound is determined to be longer than the constant time T (YES), then the sound is determined to be a human voice (step S86). Furthermore, if the duration of the sound is not longer than the constant time T (NO), the process returns to step S81. The series of processes from step S82 onward are performed by operating the determination section 222e.

Because the sound pressure calculation section is required by both the sound source location processing section 221 and the speech distinguishing section 222, a structure in which the sound pressure calculation section is shared by both the sound source location processing section 221 and the speech distinguishing section 222 may also be used.

Next, a determination is made as to whether or not the position of the sound source calculated in this manner lies within the angle of visibility of the humanoid robot (step S6). If the sound source is determined to already lie within the angle of visibility of the humanoid robot, the process proceeds to step S8. In contrast, if the sound source is determined to lie outside the angle of visibility, then the direction of the robot head section 1 is changed by operating the head drive section 13, according to instructions from the operation instruction section 25, and based on the determined direction $θ_s$ of the sound source (step S7). The process then returns to step S1.

In addition, a determination is made as to whether or not the input sound detected in step S5 is human speech (step S8). If the sound is determined to be human speech (YES), then a further determination is made as to whether or not the speech is an instruction (step S10). Furthermore, if in step S8 the sound is determined to be not human speech (NO), then after a constant length of time has passed, the robot head section 1, which had changed direction, is returned to face its original direction (step S9).

In step S10, a determination is made as to whether or not the input sound is a predetermined instruction. This determination is performed in the speech recognition section 224 by comparing the information relating to speech stored in the speech information storage section 223 with the input sound. If, as a result of this determination, the input speech is determined to be a specific instruction, then an estimation is made of the region being indicated by the fingertip of the person (step S14). Next, sight line control values are calculated based on this direction (step S15). The direction of the robot head section 1 is then changed (step S16).

On the other hand, extraction of the facial region of the person is performed by image processing (step S11). In the extraction of the facial region, the skin tone region and contour extraction methods are such that, as described above, the skin tone region extraction section 241a converts the color image captured in RGB to HLS through a color space conversion, and generates a skin tone region image comprising the skin tone regions and the other regions by extracting only the regions which correspond with skin tones using the hue components and the like. Furthermore, the contour extraction section 241b extracts the contour of the skin tone region by performing edge extraction from the skin tone region image obtained by the skin tone region extraction section 241a.

Figure 9A:
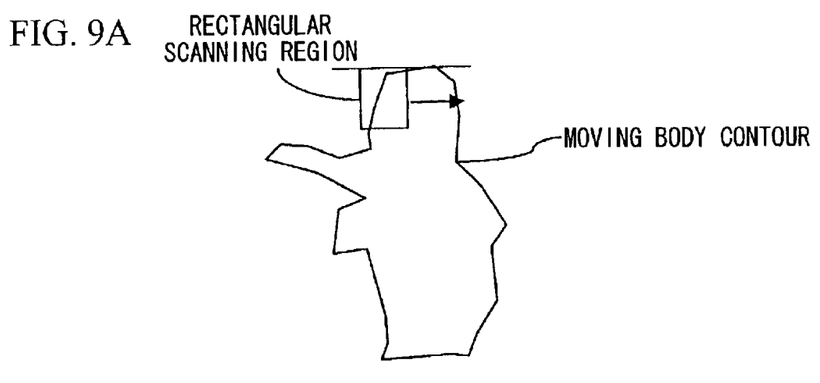
FIGS. 9A through 9C are diagrams describing the contour, the head section candidate position and the fingertip position of a moving body.
Figure 9B:
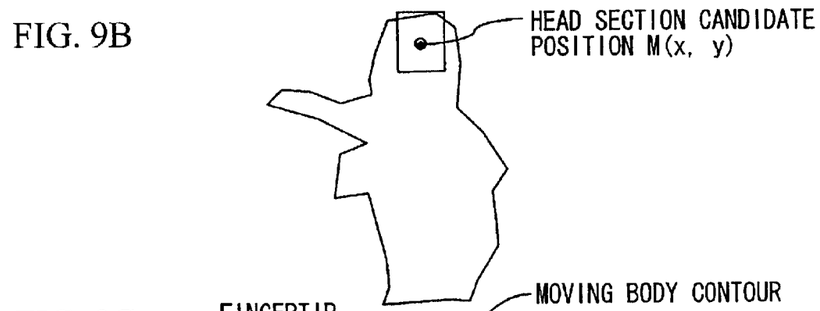
Figure 9C:
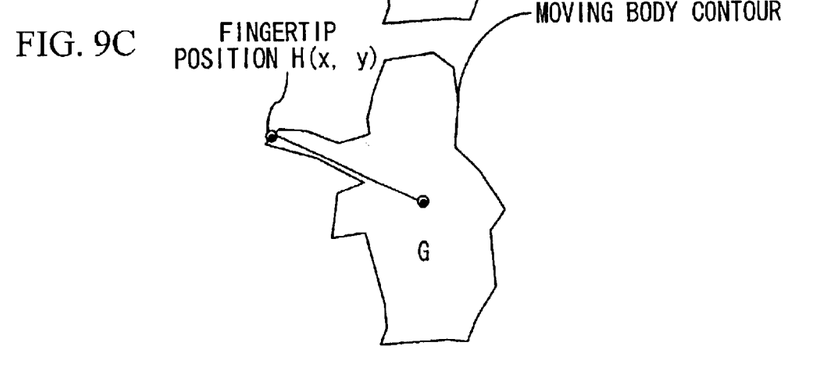

In the extraction of the facial region, using the highest point of the contour within the image as the starting point, a rectangular region of a size determined according to the distance is scanned, the position within the contour which contains the most pixels is calculated, and this position is deemed the head section candidate position M(x, y). Here, (x, y) represent coordinates on the image, with x indicating the right direction and y indicating the left direction, assuming that the starting point is the top left of the image. FIGS. 9A through 9C are diagrams describing the contour, the head section candidate positions and the fingertip position of a moving body. The processing relating to the fingertip position shown in FIG. 9C is described below.

Figure 10A:
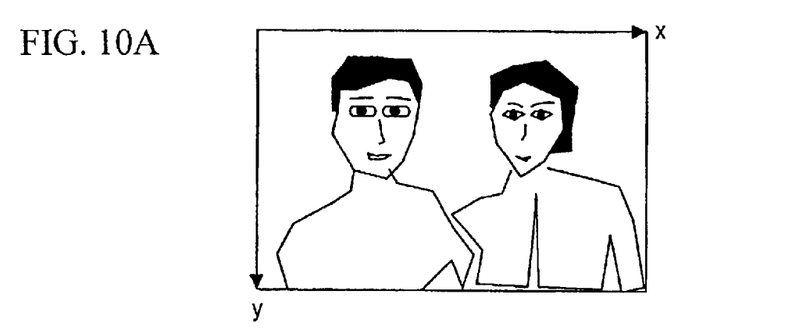
FIGS. 10A and 10B are diagrams describing the relationship between the captured color image and the extracted facial image candidate F(x, y).
Figure 10B:
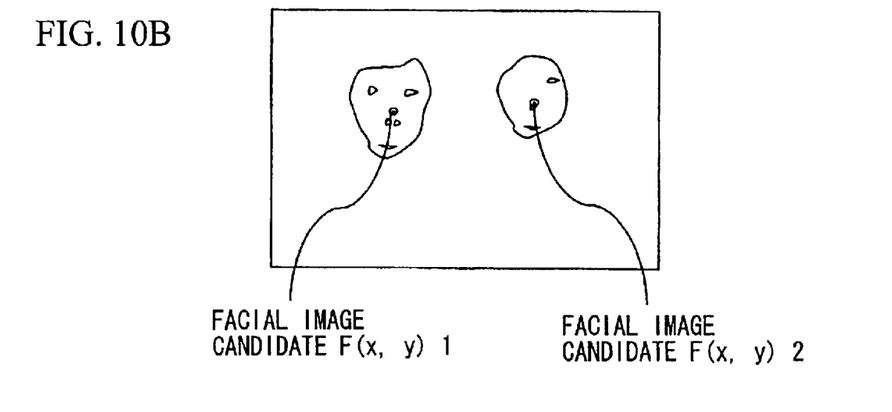

FIGS. 10A and 10B are diagrams describing the relationship between the captured color image and the extracted facial image candidate F(x, y).

The direction $\theta_s$ of the sound source, the speech recognition results $C_V$, the head section candidate position M(x, y), and the facial candidate position F(x, y), which represent the sight line control values obtained by the processes described above, are then calculated (step S12). By inputting this data into the operation instruction section 25, the operation of the head drive section 13 or the arms and legs drive section 31 is controlled, causing the robot head section 1 or the robot arms and legs section 3 to move (step S13). For example, the head section candidate position M(x, y), or the head section candidate position M(x, y) at which the difference between the relative angle of the facial candidate position F(x, y) and the direction $\theta_s$ of the sound source is smallest, is selected, and from this selection, the pan and tilt angles are calculated. However if no sound has been input, the distance between the head section candidate position M(x, y) and the facial candidate position F(x, y) can be calculated within a certain threshold by formula (2).

$$G(x,y)=1/n*\{M(x,y)+F(x,y)\} \quad (2)$$

where, n is the aggregate of the positions where the respective distances are within the threshold.

The robot head section 1 is then controlled by selecting the G(x, y) for which the distance to the moving body is closest, and then calculating the pan and tilt sight line control values based on this selected value. In the method of selecting the distance to the moving body, in the case of a plurality of moving bodies it is possible to control the pan and tilt of the robot head section 1 in an appropriate sequence, and control the line of sight of the robot to cover all the different possibilities.

Furthermore, if no sound has been input, and only the facial candidate position F(x, y) has been determined, then the pan and tilt angles are calculated in sequence, beginning from those which are closest to the center of the image, thereby controlling the robot head section 1. In addition, if no sound has been input and only the head section candidate position M(x, y) has been determined, then the pan and tilt angles are calculated in sequence, beginning from those which are closest in distance, thereby controlling the robot head section 1.

On the other hand, if the speech input in step S10 is an instruction such as "this" or "here", then the fingertip position H(x, y) is estimated (step S14). In other words, as shown in FIG. 9, a point H(x, y) upon the contour which is farthest away from the center of gravity G of the moving body, determined from the average position of the pixels within the contour and the position of the head section candidate position M(x, y), and which lies in the portion above the center of gravity G, is estimated as the fingertip position by the target image estimation section 241c. Here, the fingertip position may also be determined by extracting the skin tone region from within a rectangular region centered about H(x, y). Next, based on this position, operation instruction information such as the pan and tilt angles for the head drive section 13 are calculated in the operation instruction section 25 (step S15). Operation commands are then sent to the head drive section 13, and the robot head section 1 changes direction, for example (step S16).

Furthermore in the present embodiment, in addition to the method using differences as described above, the contour extraction device may also utilize a method in which the contour of the moving body is extracted from a time series image obtained from the stereo image using a moving body extraction algorithm called a "snake". In this method, the distance at which there is the highest distribution of moving edges within a given search region is assumed to be the distance to the moving body, and the edges in the vicinity of this distance are deemed the image energy. A contour is then extracted from this image energy as external energy, using a snake algorithm.

A system is also possible in which a program for realizing the functions of the speech processing section 22 and the image processing section 24 of FIG. 1 is stored on a computer readable medium, and the program stored on this computer readable medium is read by a computer system and executed to perform facial region detection and the like. The term "computer system" as used here includes both the OS and the hardware including any peripheral devices. Furthermore, if a WWW system is used, then this "computer system" includes any home page provision environment (or display environment).

Furthermore, a "computer readable storage medium" refers to removable media such as floppy discs, magneto-optical disks, ROM, CD-ROMs and the like, as well as internal storage devices such as hard disks. In the case where the program is sent over a network such as the internet or a communication line such as telephone lines, the term "computer readable storage medium" also includes any device which stores the program temporarily, such as the RAM inside the computer systems which constitute a client or a server or the like.

Furthermore, the program may be sent from a computer system which stores the program in a storage device to another computer system via a transmission medium or by transmitted waves inside a transmission medium. Here, the "transmission medium" which transmits the program refers to media which have the function of transmitting data, including networks such as the internet (communication networks), and communication lines such as telephone lines (communications lines). The program may also be a program which realizes only one portion of the functions described above. In addition, the program may also realize the functions described above in conjunction with a program already stored on the computer system, or in other words may use differential files (differential programs).

According to the first aspect of the present invention, as described above, even when a person or the like who lies outside the visual field of the camera mounted on the autonomous action robot emits a sound, it is possible to automatically move the imaging direction of the camera to face the direction of the person or the like in response to the sound.

Furthermore, according to the second aspect of the present invention, by extracting and identifying the face of the human who emits the sound, it is possible to perform individual recognition of a specific person.

In addition, according to the third aspect of the present invention, it is possible to perform predetermined attitude variation or movement operations according to the nature of the speech command emitted by a person.

Furthermore, according to the fourth aspect of the present invention, it is possible to not only recognize the position of a person from his/her voice, but also to behave like a human, thus establishing a sense of affinity with the person.

Moreover, according to the fifth aspect of the present invention, it is possible to extract the contour of a person with high accuracy using a moving body extraction algorithm which uses a dynamic contour model.

Furthermore, according to the sixth aspect of the present invention, it is possible to detect not only the direction of the person or the like who emitted the sound, but also information relating to the three-dimensional positional relationship with the camera.

Consequently, the present invention can turn its line of sight to face a person who calls out, can recognize the face of a person, and can perform various actions in response to commands.

Having thus described an exemplary embodiment of the invention, it will be apparent that various alternations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. An autonomous action robot comprising:
   a sound detection unit which detects a sound emitted from a sound source;
   a sound source locating unit which specifies a direction of the sound source based on the sound detected by the sound detection unit;
   an imaging unit which captures an image of surroundings;
   a target image extraction unit which extracts a target image of a specific shape from the image captured by the imaging unit; and
   a control unit which controls an imaging direction of the imaging unit to face a direction of the target image based on the specified sound source direction and the extracted target image.

2. An autonomous action robot according to claim 1, wherein
   the specific shape is a shape of a human face, and there is further provided an identification unit which identifies a specific human face.

3. An autonomous action robot according to claim 1, further comprising:
   a speech recognition unit which recognizes a detected sound as a specific speech command; and
   an attitude and position changing unit which changes an attitude and/or a position of the robot based on the recognized speech command.

4. An autonomous action robot according to claim 2, further comprising:
   a speech recognition unit which recognizes a detected sound as a specific speech command; and
   an attitude and position changing unit which changes an attitude and/or a position of the robot based on the recognized speech command.

5. An autonomous action robot comprising:
   a sound detection unit which detects a sound emitted from a sound source;
   a sound source locating unit which specifies a direction of the sound source based on the sound detected by the sound detection unit;
   an imaging unit which captures an image of surroundings,
   a target image extraction unit which extracts a target image of a specific shape from the image captured by the imaging unit; and
   an attitude and position changing unit which changes an attitude and a position of the robot to face towards the target image based on the specified sound source direction and the extracted target image.

6. An autonomous action robot according to claim 1, further comprising:
   a contour extraction unit which extracts a contour of the target image by applying a dynamic contour model to the captured image.

7. An autonomous action robot according to claim 5, further comprising:
   a contour extraction unit which extracts a contour of the target image by applying a dynamic contour model to the captured image.

8. An autonomous action robot according to claim 1, wherein the imaging unit comprises at least two coordinated imaging devices, and there is further provided a distance information detection unit which detects distance information by viewing a stereo image comprising two of the captured images stereoscopically.

9. An autonomous action robot according to claim 4, wherein
   the imaging unit comprises at least two coordinated imaging devices, and
   there is further provided a distance information detection unit which detects distance information by viewing a stereo image comprising two of the captured images stereoscopically.

* * * * *